United States Patent
Yang et al.

(10) Patent No.: US 11,513,295 B2
(45) Date of Patent: Nov. 29, 2022

(54) OPTICAL COUPLING STRUCTURE, SYSTEM AND METHOD FOR PREPARING OPTICAL COUPLING STRUCTURE

(71) Applicant: INSTITUTE OF SEMICONDUCTORS, CHINESE ACADEMY OF SCIENCES, Beijing (CN)

(72) Inventors: Lin Yang, Beijing (CN); Shanglin Yang, Beijing (CN); Lei Zhang, Beijing (CN)

(73) Assignee: INSTITUTE OF SEMICONDUCTORS, CHINESE ACADEMY OF SCIENCES, Beijing (CN)

(*) Notice: Subject to any disclaimer, the term of this patent is extended or adjusted under 35 U.S.C. 154(b) by 0 days.

(21) Appl. No.: 17/265,313

(22) PCT Filed: Dec. 13, 2018

(86) PCT No.: PCT/CN2018/120911
§ 371 (c)(1),
(2) Date: Feb. 2, 2021

(87) PCT Pub. No.: WO2020/118625
PCT Pub. Date: Jun. 18, 2020

(65) Prior Publication Data
US 2022/0113474 A1    Apr. 14, 2022

(51) Int. Cl.
*G02B 6/30* (2006.01)
*G02B 6/136* (2006.01)
*G02B 6/12* (2006.01)
(Continued)

(52) U.S. Cl.
CPC ............ *G02B 6/30* (2013.01); *G02B 6/0046* (2013.01); *G02B 6/12002* (2013.01);
(Continued)

(58) Field of Classification Search
CPC ................. G02B 6/12; G02B 6/12002; G02B 6/12004; G02B 6/34; G02B 6/136; G02B 6/4201–4203; G02B 6/0046; G02B 6/30
(Continued)

(56) References Cited

U.S. PATENT DOCUMENTS

| 2006/0204175 A1 | 9/2006 | Laurent-Lund et al. |
| 2013/0236193 A1* | 9/2013 | Sengupta ................. G02B 6/14 398/143 |

(Continued)

FOREIGN PATENT DOCUMENTS

| CN | 102721431 A | 10/2012 |
| CN | 103163600 A | 6/2013 |

(Continued)

OTHER PUBLICATIONS

International Search Report dated Sep. 12, 2019 for International Patent Application No. PCT/CN2018/120911, 4 pages including English translation.
Japanese Office Action dated May 9, 2022 for Japanese Patent Application No. 2021-532174, 8 pages including English translation.

*Primary Examiner* — Michael P Mooney
(74) *Attorney, Agent, or Firm* — Christopher R. Christenson; Kelly, Holt & Christenson, PLLC

(57) ABSTRACT

An optical coupling structure, an optical coupling system and a method for preparing the optical coupling structure are provided. The method includes: step S101: preparing a base substrate; step S102: forming a lithium niobate optical waveguide on the base substrate; step S103: forming a silicon dioxide core layer enclosing the lithium niobate optical waveguide on peripheral walls of the lithium niobate optical waveguide; step S104: forming a silicon dioxide cladding layer enclosing the silicon dioxide core layer on peripheral walls of the silicon dioxide core layer. The optical (Continued)

coupling structure alleviates a technical problem of low coupling efficiency between the lithium niobate optical waveguide and the single-mode optical fiber in the related art, and achieves a technical effect of improving the coupling efficiency between the lithium niobate optical waveguide and the single-mode optical fiber.

10 Claims, 8 Drawing Sheets

(51) Int. Cl.
   *G02B 6/42* (2006.01)
   *F21V 8/00* (2006.01)
   *G02B 6/34* (2006.01)

(52) U.S. Cl.
   CPC ............ *G02B 6/136* (2013.01); *G02B 6/4203* (2013.01); *G02B 6/4204* (2013.01); *G02B 6/34* (2013.01)

(58) Field of Classification Search
   USPC ...................................... 385/36, 43, 129–132
   See application file for complete search history.

(56) References Cited

U.S. PATENT DOCUMENTS

| | | | |
|---|---|---|---|
| 2014/0004638 A1 | 1/2014 | Rabiei | |
| 2014/0177995 A1* | 6/2014 | Mohammed | G02B 6/12004 385/79 |
| 2020/0064706 A1* | 2/2020 | Villa | G02F 1/2255 |
| 2021/0072459 A1* | 3/2021 | Kippenberg | G02B 6/122 |

FOREIGN PATENT DOCUMENTS

| | | | | |
|---|---|---|---|---|
| CN | 105607185 A | * | 5/2016 | ............ G02B 6/122 |
| CN | 105607185 A | | 5/2016 | |
| CN | 106154426 A | | 11/2016 | |
| CN | 107561640 A | | 1/2018 | |
| JP | 60-011807 | | 1/1985 | |
| JP | 2-257110 A | | 10/1990 | |
| JP | 2007052328 A | | 3/2007 | |
| JP | 2007072433 A | | 3/2007 | |
| JP | 2012083446 A | | 4/2012 | |
| JP | 2015045789 A | | 3/2015 | |

\* cited by examiner

OPTICAL COUPLING STRUCTURE, SYSTEM AND METHOD FOR PREPARING OPTICAL COUPLING STRUCTURE

CROSS-REFERENCE TO RELATED APPLICATION

This application is a National Stage Application of International Application No. PCT/CN2018/120911, filed on Dec. 13, 2018.

TECHNICAL FIELD

The present disclosure relates to a field of optical fiber communication and integrated optics, in particular to an optical coupling structure, a system and a method for preparing the optical coupling structure.

BACKGROUND

Conventional lithium niobate devices are prepared by processes such as high-temperature proton exchange, and have defects such as large device volume and poor process consistency. The emergence of the lithium niobate etching process has made it possible to integrate multiple optical functional devices on a lithium niobate wafer using processes such as photolithography and etching.

In practical applications, a cross-sectional area of lithium niobate optical waveguide is on an order of square microns, while a cross-sectional area of single-mode optical fiber is on an order of hundreds of square microns. Because the cross-sectional area of lithium niobate optical waveguide is different from that of single-mode optical fiber on the order of magnitude, a mode field between the lithium niobate optical waveguide and the single-mode optical fiber will not match. It leads to a problem of low coupling efficiency between the lithium niobate optical waveguide and the single-mode optical fiber.

SUMMARY

(1) Technical Problems to be Solved

In view of the above problems, the present disclosure provides an optical coupling structure, a system, and a method for preparing the optical coupling structure, so as to at least partially solve the above existing technical problems.

(2) Technical Solutions

According to an aspect of the present disclosure, there is provided an optical coupling structure, including: a base substrate; a lithium niobate optical waveguide formed on the base substrate; a silicon dioxide core layer formed on peripheral walls of the lithium niobate optical waveguide and enclosing the lithium niobate optical waveguide; and a silicon dioxide cladding layer formed on peripheral walls of the silicon dioxide core layer and enclosing the silicon dioxide core layer.

In some embodiments, an end face of the silicon dioxide core layer is rectangular or trapezoidal, and an area of the end face of the silicon dioxide core layer ranges from tens of square microns to hundreds of square microns.

In some embodiments, the optical coupling structure further includes: an adhesive; where the adhesive is provided on end faces of the silicon dioxide core layer and the silicon dioxide cladding layer in a light transmission direction, and a difference value between a refractive index of the adhesive and a refractive index of the silicon dioxide core layer is less than 0.5.

According to another aspect of the present disclosure, there is also provided an optical coupling system, including: a first single-mode optical fiber, a second single-mode optical fiber, and the optical coupling structure; where a first end of the optical coupling structure is connected to the first single-mode optical fiber, a second end of the optical coupling structure is connected to the second single-mode optical fiber, and the first end and the second end are both located in the light transmission direction.

In some embodiments, a difference value between a refractive index of the silicon dioxide core layer and a refractive index of the silicon dioxide cladding layer is $\Delta n$, and a difference value between a refractive index of a core region of the single-mode optical fiber and a cladding layer of the single-mode optical fiber is $\Delta n'$, and $\Delta n - \Delta n' < 0.5$.

In some embodiments, the lithium niobate optical waveguide includes a cuboid waveguide in middle, and a first quadrangular prism waveguide and a second quadrangular prism waveguide located at both ends of the cuboid waveguide respectively, the first quadrangular prism waveguide is close to the first end, an end face of the first quadrangular prism waveguide away from the first single-mode optical fiber is connected to an end face of the cuboid waveguide, a distance between an end face of the first quadrangular prism waveguide close to the first single-mode optical fiber and the first end is greater than 0, and a cross-sectional dimension of the first quadrangular prism waveguide gradually decreases in a direction away from the first single-mode optical fiber to close to the first single-mode optical fiber; the second quadrangular prism waveguide is close to the second end, an end face of the second quadrangular prism waveguide away from the second single-mode optical fiber is connected to an end face of the cuboid waveguide, a distance between the end face of the second quadrangular prism waveguide close to the second single-mode optical fiber and the second end is greater than 0, and a cross-sectional dimension of the second quadrangular prism waveguide gradually decreases in a direction away from the second single-mode optical fiber to close to the second single-mode optical fiber.

According to another aspect of the present disclosure, there is provided a method for preparing an optical coupling structure, including: step S101: preparing a base substrate; step S102: forming a lithium niobate optical waveguide on the base substrate; step S103: forming a silicon dioxide core layer enclosing the lithium niobate optical waveguide on peripheral walls of the lithium niobate optical waveguide; step S104: forming a silicon dioxide cladding layer enclosing the silicon dioxide core layer on peripheral walls of the silicon dioxide core layer.

In some embodiments, the base substrate includes a quartz substrate layer, a silicon dioxide buried layer, and a lithium niobate thin film layer in order from bottom to top, and the forming a lithium niobate optical waveguide on the base substrate includes: etching the lithium niobate thin film layer by photoetching to form the lithium niobate optical waveguide.

In some embodiments, the forming a silicon dioxide core layer enclosing the lithium niobate optical waveguide on peripheral walls of the lithium niobate optical waveguide includes: forming a silicon dioxide capping layer on the structure formed in step S102; planarizing the silicon dioxide capping layer; removing a part of the silicon dioxide capping layer and a part of the silicon dioxide buried layer by photoetching, and etching to top of the quartz substrate layer. An etched silicon dioxide capping layer and an etched silicon dioxide buried layer form a silicon dioxide core layer; a length of the silicon dioxide core layer in a light transmission direction is greater than a length of the lithium niobate optical waveguide in the light transmission direction.

In some embodiments, the forming a silicon dioxide cladding layer enclosing the silicon dioxide core layer on peripheral walls of the silicon dioxide core layer includes: forming a silicon dioxide top layer on the structure formed in step S103, and the silicon dioxide top layer and the quartz substrate layer form the silicon dioxide cladding layer; the length of the silicon dioxide core layer in the light transmission direction is equal to a length of the silicon dioxide cladding layer in the light transmission direction.

(3) Beneficial Effects

It may be seen from the above technical solutions that the optical coupling structure, a system and a method for preparing the optical coupling structure provided by the present disclosure have the following beneficial effects.

(1) The optical coupling structure includes a silicon dioxide core layer formed on peripheral walls of a lithium niobate optical waveguide and enclosing the lithium niobate optical waveguide; and a silicon dioxide cladding layer formed on peripheral walls of the silicon dioxide core layer and enclosing the silicon dioxide core layer. Since an area of an end face of the silicon dioxide core layer is greater than a cross-sectional area of the lithium niobate optical waveguide, the area of the end face of the silicon dioxide core layer is closer to a cross-sectional area of the single-mode optical fiber, which may reduce an optical loss caused by a mode field mismatch. Therefore, a technical problem of low coupling efficiency between the lithium niobate optical waveguide and the single-mode optical fiber in the related art is alleviated, and a technical effect of improving the coupling efficiency between the lithium niobate optical waveguide and the single-mode optical fiber is achieved.

(2) The end face of the silicon dioxide core layer is rectangular or trapezoidal. The area of the end face of the silicon dioxide core layer ranges from tens of square microns to hundreds of square microns. The difference value between the refractive index of the silicon dioxide core layer and the refractive index of the silicon dioxide cladding layer is $\Delta n$, and the difference value between the refractive index of the core region of the single-mode optical fiber and a refractive index of the cladding layer of the single-mode optical fiber is $\Delta n'$, and $n-\Delta n' <0.5$, so as to cause the optical coupling structure to match the mode field of the single-mode optical fiber, and reduce a mode mismatch loss caused by a mode mutation. Therefore, the technical problem of low coupling efficiency between the lithium niobate optical waveguide and the single-mode optical fiber existing in the related art may be alleviated, and a technical effect of improving the coupling efficiency between the lithium niobate optical waveguide and the single-mode optical fiber is achieved.

(3) The optical coupling structure also includes: an adhesive, the adhesive is provided on the end faces of the silicon dioxide core layer and the silicon dioxide cladding layer in the light transmission direction, and the difference value between the refractive index of the adhesive and the refractive index of the silicon dioxide core layer is less than 0.5. Therefore, a Fresnel reflection loss caused by a sudden change in refractive index is reduced during coupling of light from the optical coupling structure to the single-mode optical fiber. Therefore, the technical problem of low coupling efficiency between the lithium niobate optical waveguide and the single-mode optical fiber existing in the related art may be alleviated, and a technical effect of improving the coupling efficiency between the lithium niobate optical waveguide and the single-mode optical fiber is achieved.

(4) The cross-sectional dimension of the first quadrangular prism waveguide gradually decreases in a direction away from the first single-mode optical fiber to close to the first single-mode optical fiber. The cross-sectional dimension of the second quadrangular prism waveguide gradually decreases in a direction away from the second single-mode optical fiber to close to the second single-mode optical fiber, so that an optical field may be slowly transited from the lithium niobate optical waveguide to a silicon dioxide waveguide to reduce the optical loss during the transition. Therefore, the technical problem of low coupling efficiency between the lithium niobate optical waveguide and the single-mode optical fiber existing in the related art may be alleviated, and a technical effect of improving the coupling efficiency between the lithium niobate optical waveguide and the single-mode optical fiber is achieved.

(5) In the present disclosure, the photoetching process is used to obtain the optical coupling structure, which avoids the problems of high process difficulty and poor device consistency caused by the high-temperature proton exchange process in the related art for preparing lithium niobate devices. Therefore, the process difficulty of preparing the optical coupling structure is reduced, and the consistency of the optical coupling structure is improved.

(6) In the present disclosure, no grating is used in the process of preparing the optical coupling structure, so the problem of sensitivity to the light polarization state caused by the use of gratings to prepare the optical coupling structure in the related art may be avoided, and therefore, the optical coupling structure that is insensitive to the light polarization state reduces the time that the workers use the optical coupling structure and improves the use efficiency of the workers.

BRIEF DESCRIPTION OF THE DRAWINGS

In order to more clearly explain the specific embodiments of the present disclosure or the technical solutions in the related art, the following will briefly introduce the drawings that need to be used in the specific embodiments or the description of the related art. Obviously, the drawings in the following description are some embodiments of the present disclosure. For those of ordinary skill in the art, other drawings may be obtained based on these drawings without creative work.

DETAILED DESCRIPTION OF EMBODIMENTS

In order to make the objectives, technical solutions, and advantages of the present disclosure clearer, the following further describes the present disclosure in detail in conjunction with specific embodiments and with reference to the drawings.

An optical coupling structure, a system and a method for preparing the optical coupling structure provided by the embodiments of the present disclosure may alleviate a technical problem of low coupling efficiency between a lithium niobate optical waveguide and a single-mode optical fiber in the related art, and achieve a technical effect of improving the coupling efficiency between the lithium niobate optical waveguide and the single-mode optical fiber.

Figure 1:
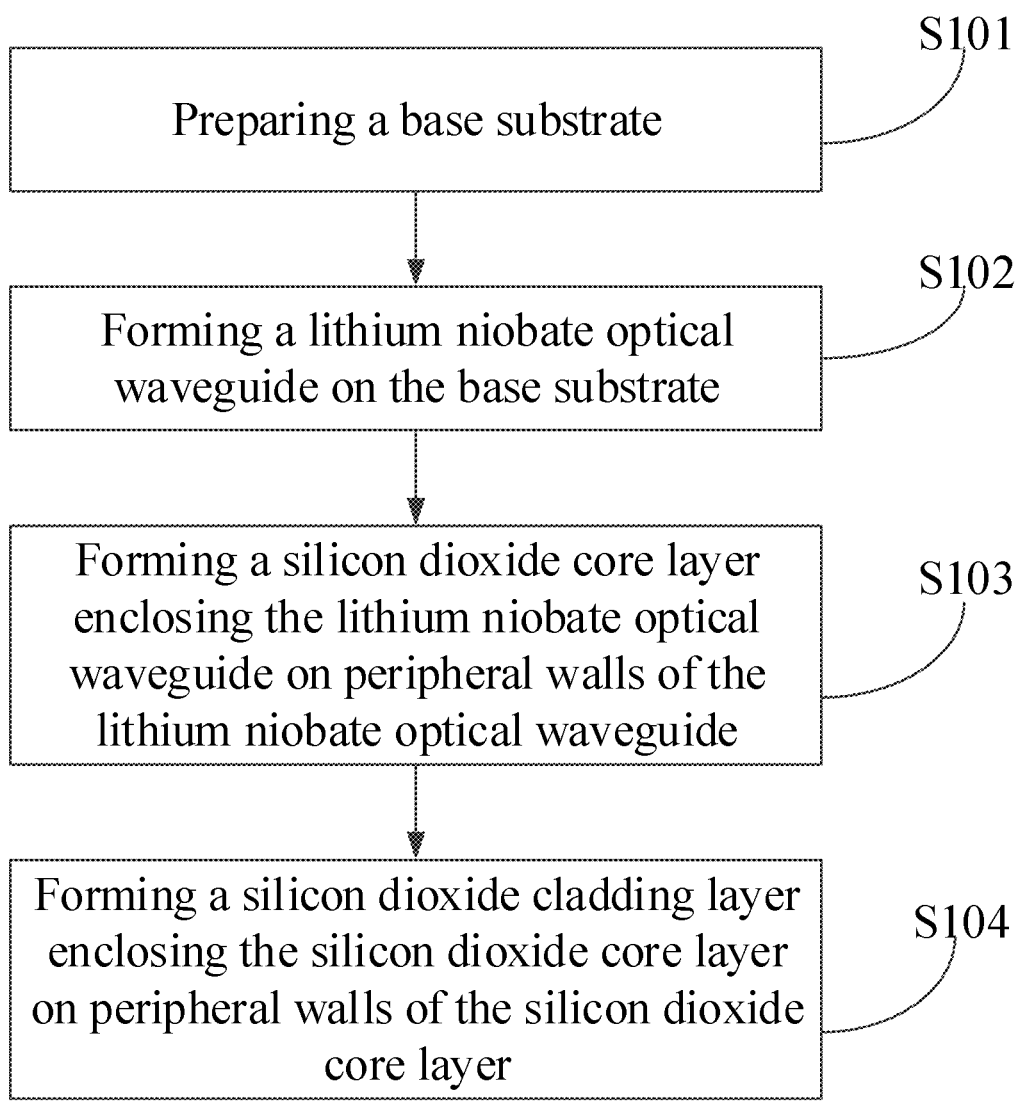
FIG. 1 is a flowchart of a method for preparing an optical coupling structure according to an embodiment of the present disclosure.

In order to facilitate the understanding of the embodiments of the present disclosure, a method for preparing an optical coupling structure according to an embodiment of the present disclosure is first introduced in detail. As shown in FIG. 1, the method for preparing an optical coupling structure may include the following steps.

Step S101: A base substrate is prepared.

Figure 2:
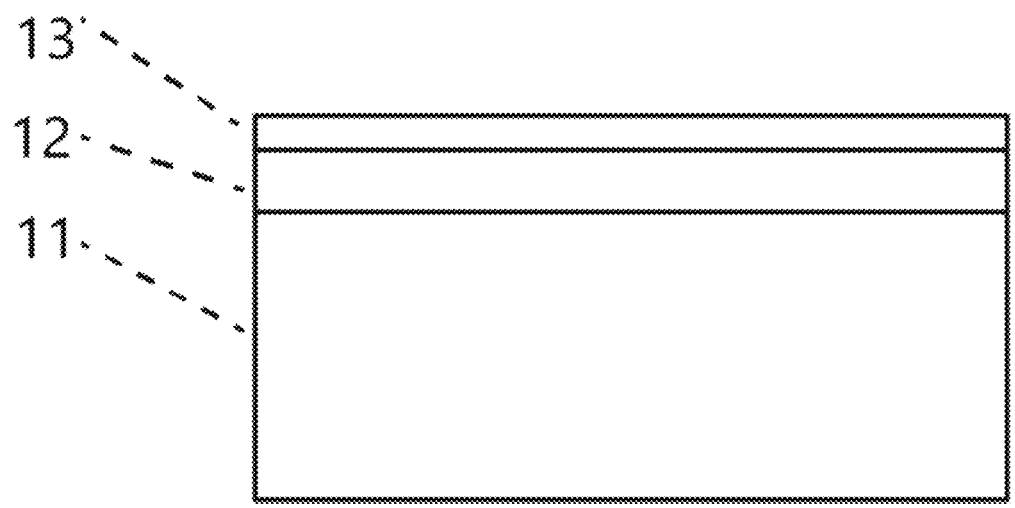
FIG. 2 is a front view of a base substrate before a lithium niobate optical waveguide is formed according to an embodiment of the present disclosure.

Where, as shown in FIG. 2, the base substrate may include a quartz substrate layer 11, a silicon dioxide buried layer 12, and a lithium niobate thin film layer 13 in order from bottom to top. A material component of the quartz substrate layer 11 may be pure silicon dioxide, or may be doped silicon dioxide. The quartz substrate layer 11 may play a role in supporting the entire optical coupling structure. The silicon dioxide buried layer 12 may be a deposited silicon dioxide adjusted by a deposition (sedimentation) process. A material component of the silicon dioxide buried layer 12 may be pure silicon dioxide, or may be doped silicon dioxide. The lithium niobate thin film layer 13 may be bonded to the silicon dioxide buried layer 12 by a special process. A material component of the lithium niobate thin film layer 13 may be pure lithium niobate, or may be a doped lithium niobate material.

Further, a refractive index range of the quartz substrate layer 11 for light with a wavelength of 1550 nm is approximately 1.4 to 1.6. A refractive index range of the silicon dioxide buried layer 12 for light with a wavelength of 1550 nm is approximately 1.4 to 1.6.

It should be noted that the refractive index of the silicon dioxide buried layer 12 is higher than the refractive index of the quartz substrate layer 11.

Step S102: A lithium niobate optical waveguide is formed on the base substrate.

Figure 3:
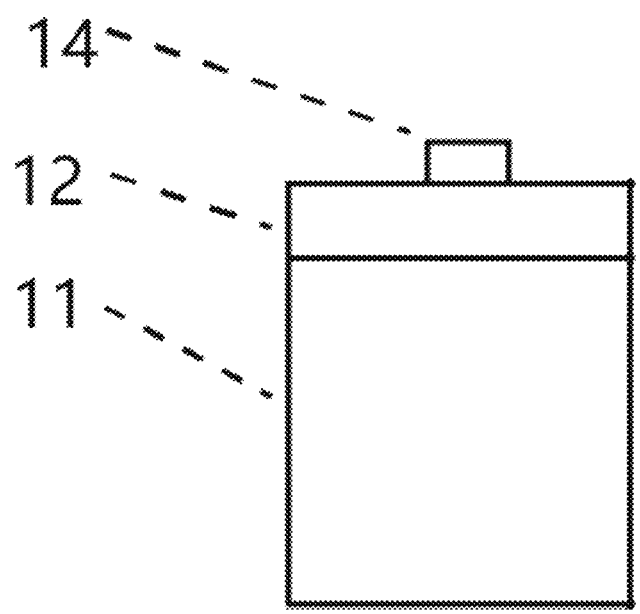
FIG. 3 is a front view of a base substrate after a lithium niobate optical waveguide is formed according to an embodiment of the present disclosure.
Figure 4:
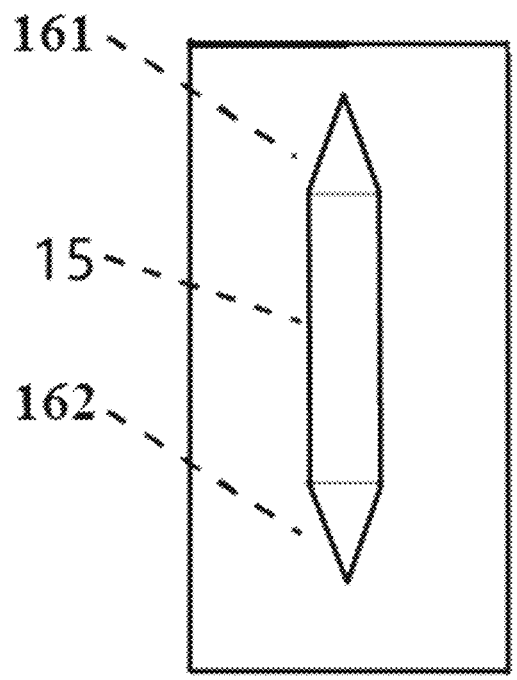
FIG. 4 is a top view of a base substrate after a lithium niobate optical waveguide is formed according to an embodiment of the present disclosure.

Where, step S102 may include: as shown in FIG. 3, etching the lithium niobate thin film layer 13 by photoetching to form a lithium niobate optical waveguide 14. As shown in FIG. 4, the lithium niobate optical waveguide 14 may include a cuboid waveguide 15 in middle, and a first quadrangular prism waveguide 161 and a second quadrangular prism waveguide 162 located at both ends of the cuboid waveguide 15 respectively.

Step S103: A silicon dioxide core layer enclosing the lithium niobate optical waveguide is formed on peripheral walls of the lithium niobate optical waveguide.

Preferably, a shape of an end face of the silicon dioxide core layer is rectangular or trapezoidal, and an area of the end face of the silicon dioxide core layer ranges from tens of square microns to hundreds of square microns.

Where, forming a silicon dioxide core layer enclosing the lithium niobate optical waveguide on peripheral walls of the lithium niobate optical waveguide may include the following steps.

Figure 5:
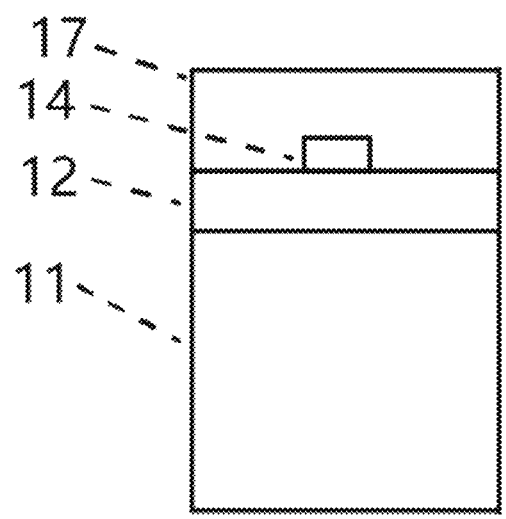
FIG. 5 is a front view of a silicon dioxide waveguide before a silicon dioxide core layer is formed according to an embodiment of the present disclosure.

As shown in FIG. 5, a silicon dioxide capping layer 17 is formed on the structure formed in step S102.

Exemplarily, the silicon dioxide capping layer 17 may be pure silicon dioxide or doped silicon dioxide formed by a deposition (sedimentation) process. The silicon dioxide capping layer 17 covers the lithium niobate optical waveguide 14. A difference value between a refractive index of the silicon dioxide capping layer 17 and the refractive index of the quartz substrate layer 11 may be set within 10%. Specifically, a refractive index range of the silicon dioxide capping layer 17 for light with a wavelength of 1550 nm is approximately 1.4 to 1.6.

Specifically, a plasma-enhanced chemical vapor deposition PECVD process may be used to form the silicon dioxide capping layer 17, and silicon dioxide is generated by a reaction of silane and nitric oxide at 350 degrees Celsius. The reaction equation is as follows: $SiH_4$ (gaseous state)+ $2N_2O$ (gaseous state)-$SiO_2$ (solid state)+$2N_2$ (gaseous state)+$2H_2$ (gaseous state).

The silicon dioxide capping layer 17 is planarized.

Exemplarily, a chemical mechanical polishing may be used to planarize the silicon dioxide capping layer.

Figure 6:
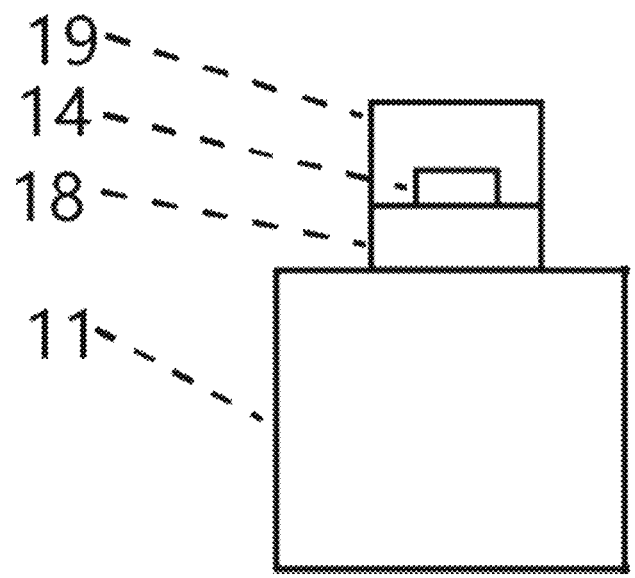
FIG. 6 is a front view of a silicon dioxide waveguide after a silicon dioxide core layer is formed according to an embodiment of the present disclosure.
Figure 7:
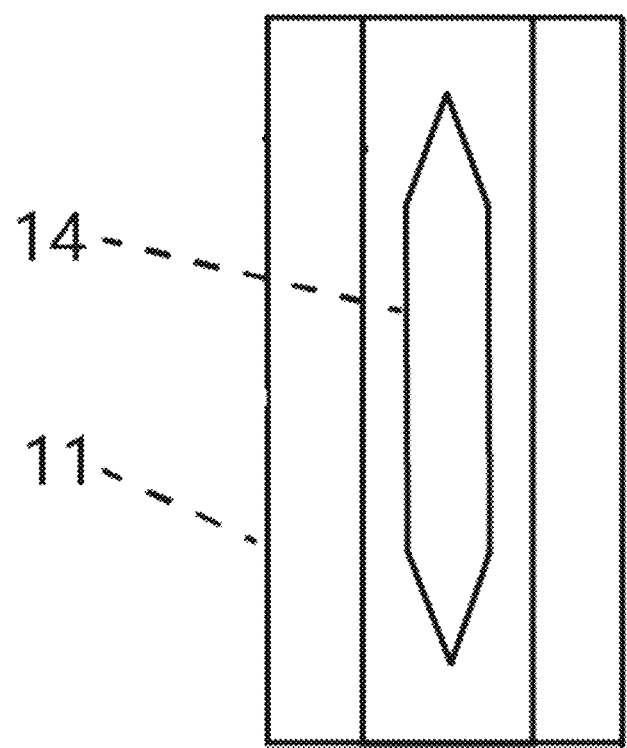
FIG. 7 is a top view of a silicon dioxide waveguide after a silicon dioxide core layer is formed according to an embodiment of the present disclosure.

As shown in FIG. 6, on the silicon dioxide capping layer that has undergone the planarization treatment, a part of the silicon dioxide capping layer and a part of the silicon dioxide buried layer are removed by photoetching. Etching is performed to top of the quartz substrate layer 11. An etched silicon dioxide capping layer 19 and an etched silicon dioxide buried layer 18 form a silicon dioxide core layer. As shown in FIG. 7, the silicon dioxide core layer completely encloses the lithium niobate optical waveguide 14.

Specifically, after coating a photoresist on the silicon dioxide capping layer, a mask is used for exposure and development to transfer a mask pattern to the photoresist. Then, the pattern on the photoresist is transferred to the silicon dioxide capping layer by etching. A mixed gas of $CF_4$ and $H_2$ is selected as a gas for etching silicon dioxide. A content of $H_2$ in the mixed gas is 50% of the volume of the mixed gas. A selection ratio of the mixed gas of $CF_4/H_2$ with this component to silicon dioxide and silicon exceeds 40:1, and the etching selectivity is better. In plasma environment, $CF_4$ may produce fluorine atoms, which react with silicon dioxide to etch silicon dioxide. The reaction equation is as follows:

$$CF_4 + e^- \rightarrow CF_3 + F + e^-$$

$$4F(\text{radical}) + SiO_2 \text{ (solid state)} \rightarrow SiF_4 \text{ (gaseous state)} + O_2 \text{ (gaseous state)}$$

Where, the function of $H_2$ is to reduce a reaction rate of $CF_4$ and silicon, and to increase a selective etching ratio of $CF_4$ to silicon dioxide and silicon. This etching process is performed to the quartz substrate layer.

It should be noted that the refractive index of the silicon dioxide buried layer may be equal to the refractive index of the silicon dioxide capping layer, and the refractive index of the silicon dioxide buried layer may also be close to that of the silicon dioxide capping layer. The refractive index of the silicon dioxide capping layer is higher than the refractive index of the quartz substrate layer. To obtain a refractive index of the silicon dioxide capping layer that meets conditions, it may be achieved by adjusting a ratio of $SiH_4$ and $2N_2O$ in a chemical method $SiH_4$ (gaseous state)+$2N_2O$ (gaseous state)→$SiO_2$ (solid state)+$2N_2$ (gaseous state)+$2H_2$ (gaseous state), and it may also be achieved by doping. If the refractive index of the silicon dioxide buried layer is equal to the refractive index of the silicon dioxide capping layer, the refractive index of the silicon dioxide buried layer may be determined as the refractive index of the silicon dioxide core layer. If the refractive index of the silicon dioxide buried layer is close to that of the silicon dioxide capping layer, an average value of the refractive index of the silicon dioxide buried layer and the refractive index of the silicon dioxide capping layer may be determined as the refractive index of the silicon dioxide core layer.

Where a length of the silicon dioxide core layer in a light transmission direction is greater than a length of the lithium niobate optical waveguide in the light transmission direction. In other words, the silicon dioxide core layer not only completely encloses the lithium niobate optical waveguide, but also an end part of the silicon dioxide core layer does not enclose the lithium niobate optical waveguide, and the end part of the silicon dioxide core layer is completely silicon dioxide waveguide.

Step S104: A silicon dioxide cladding layer enclosing the silicon dioxide core layer is formed on peripheral walls of the silicon dioxide core layer.

Figure 8:
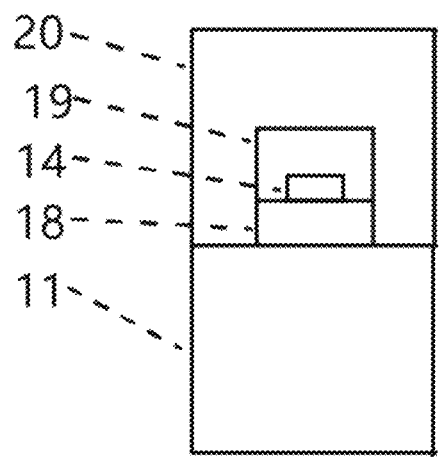
FIG. 8 is a front view of an optical coupling structure according to an embodiment of the present disclosure.

Where, as shown in FIG. 8, forming a silicon dioxide cladding layer enclosing the silicon dioxide core layer on peripheral walls of the silicon dioxide core layer includes: forming a silicon dioxide top layer 20 on the structure formed in step S103. The silicon dioxide top layer 20 and the quartz substrate layer 11 form the silicon dioxide cladding layer. The length of the silicon dioxide core layer in the light transmission direction is equal to a length of the silicon dioxide cladding layer in the light transmission direction.

Exemplarily, the silicon dioxide top layer 20 may be pure silicon dioxide or doped silicon dioxide formed by a deposition (sedimentation) process. Specifically, the silicon dioxide top layer 20 may be a deposited silicon dioxide adjusted by a deposition process. Specifically, a refractive index range of the silicon dioxide top layer 20 for light with a wavelength of 1550 nm is approximately 1.4 to 1.6.

It should be noted that a refractive index of the silicon dioxide top layer may be equal to the refractive index of the quartz substrate layer, and the refractive index of the silicon dioxide top layer may also be close to the refractive index of the quartz substrate layer. The refractive index of the silicon dioxide top layer is lower than that of the silicon dioxide buried layer. The refractive index of the silicon dioxide top layer is lower than that of the silicon dioxide capping layer. The refractive index of the silicon dioxide top layer and the refractive index of the quartz substrate layer are both lower than the refractive index of the silicon dioxide core layer. If the refractive index of the silicon dioxide top layer is equal to the refractive index of the quartz substrate layer, the refractive index of the silicon dioxide top layer may be determined as the refractive index of the silicon dioxide capping layer. If the refractive index of the silicon dioxide top layer is close to the refractive index of the quartz substrate layer, an average value of the refractive index of the silicon dioxide top layer and the refractive index of the quartz substrate layer may be determined as the refractive index of the silicon dioxide cladding layer.

This embodiment has following beneficial effects:

(1) a silicon dioxide core layer enclosing the lithium niobate optical waveguide is formed on peripheral walls of the lithium niobate optical waveguide. A silicon dioxide cladding layer enclosing the silicon dioxide core layer is formed on peripheral walls of the silicon dioxide core layer. Since the area of the end face of the silicon dioxide core layer is greater than the cross-sectional area of the lithium niobate optical waveguide, the area of the end face of the silicon dioxide core layer is closer to a cross-sectional area of a single-mode optical fiber, an optical loss caused by mode field mismatch may be reduced. It may alleviate a technical problem of low coupling efficiency between the lithium niobate optical waveguide and the single-mode optical fiber in related art, so as to achieve a technical effect of improving the coupling efficiency between the lithium niobate optical waveguide and the single-mode optical fiber;

(2) the optical coupling structure is obtained through a photolithography process and an etching process, thereby avoiding high process difficulty and poor device consistency caused by a high-temperature proton exchange process which is used to prepare lithium niobate devices in the related art, therefore the process difficulty of preparing the optical coupling structure may be reduced and the consistency of the optical coupling structure is improved;

(3) in the process of preparing the optical coupling structure, no grating is used, thereby avoiding a problem of sensitivity to a light polarization state caused by the use of gratings to prepare the optical coupling structure in the related art. Therefore, an optical coupling structure that is insensitive to the light polarization state may be obtained, which reduces time for workers to use the optical coupling structure, thereby improving the use efficiency of the workers.

In yet another embodiment of the present disclosure, an optical coupling structure described in an embodiment of the present disclosure is introduced in detail. The optical coupling structure includes a base substrate.

Where, as shown in FIG. 2, the base substrate may include a quartz substrate layer 11, a silicon dioxide buried layer 12, and a lithium niobate thin film layer 13 in order from bottom to top.

A lithium niobate optical waveguide is formed on the base substrate.

Where, as shown in FIGS. 3 and 4, the lithium niobate optical waveguide 14 may include a cuboid waveguide 15 in middle, and a first quadrangular prism waveguide 161 and a second quadrangular prism waveguide 162 located at both ends of the cuboid waveguide 15 respectively. Exemplarily, a width and a height of the cuboid waveguide 15 may range from 1 to 20 microns.

A silicon dioxide core layer is formed on peripheral walls of the lithium niobate optical waveguide and encloses the lithium niobate optical waveguide.

Preferably, a shape of an end face of the silicon dioxide core layer is rectangular or trapezoidal, and an area of the end face of the silicon dioxide core layer ranges from tens of square microns to hundreds of square microns.

A silicon dioxide cladding layer is formed on peripheral walls of the silicon dioxide core layer and encloses the silicon dioxide core layer.

In an embodiment of the present disclosure, the optical coupling structure may further include an adhesive.

The adhesive is provided on an end face of the silicon dioxide core layer and an end face of the silicon dioxide cladding layer in a light transmission direction, and a difference value between a refractive index of the adhesive and the refractive index of the silicon dioxide core layer is less than 0.5.

Where the adhesive may be used to fix the single-mode optical fiber and the end face of the silicon dioxide core layer and the end face of the silicon dioxide cladding layer in the light transmission direction.

Further, after aligning the end face of the silicon dioxide core layer and the end face of the silicon dioxide cladding layer in the light transmission direction with the single-mode optical fiber, fixing may be performed by using an adhesive. In an alignment process, a ∇-shaped groove may be etched on the quartz substrate layer first, and then the single-mode optical fiber may be placed in the ∇-shaped groove, and finally fixing may be perform by using a cover plate and an adhesive. The optical coupling structure in an embodiment of the present disclosure has a large optical bandwidth.

Figure 10:
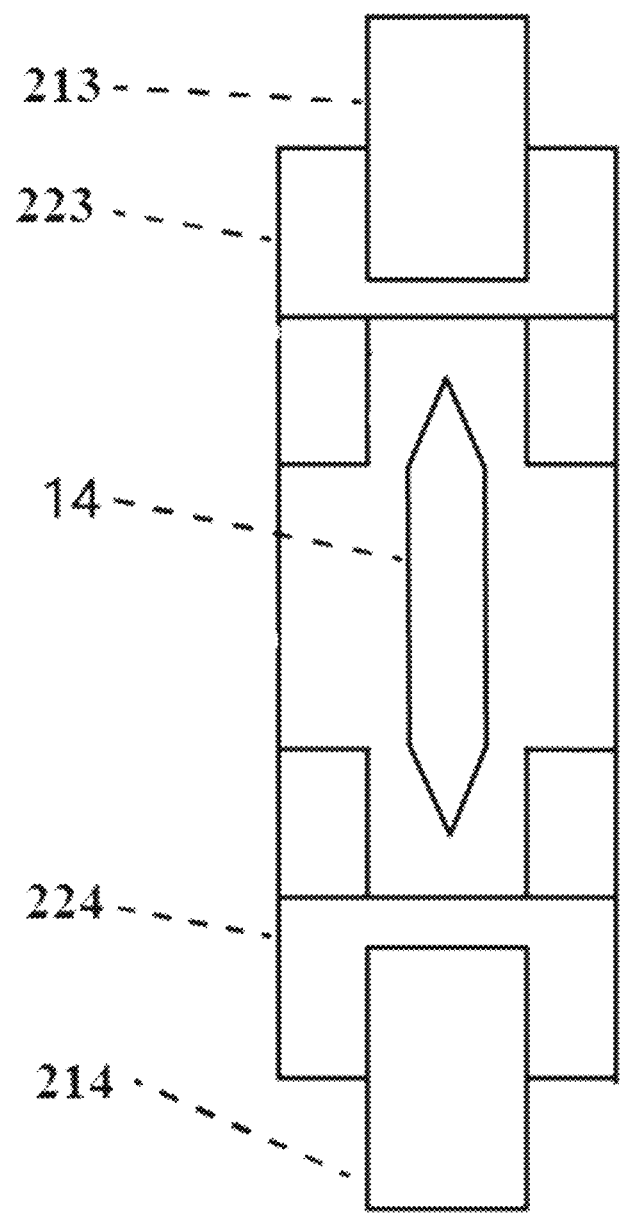
FIG. 10 is a second top view of an optical coupling system according to an embodiment of the present disclosure.
Figure 11:
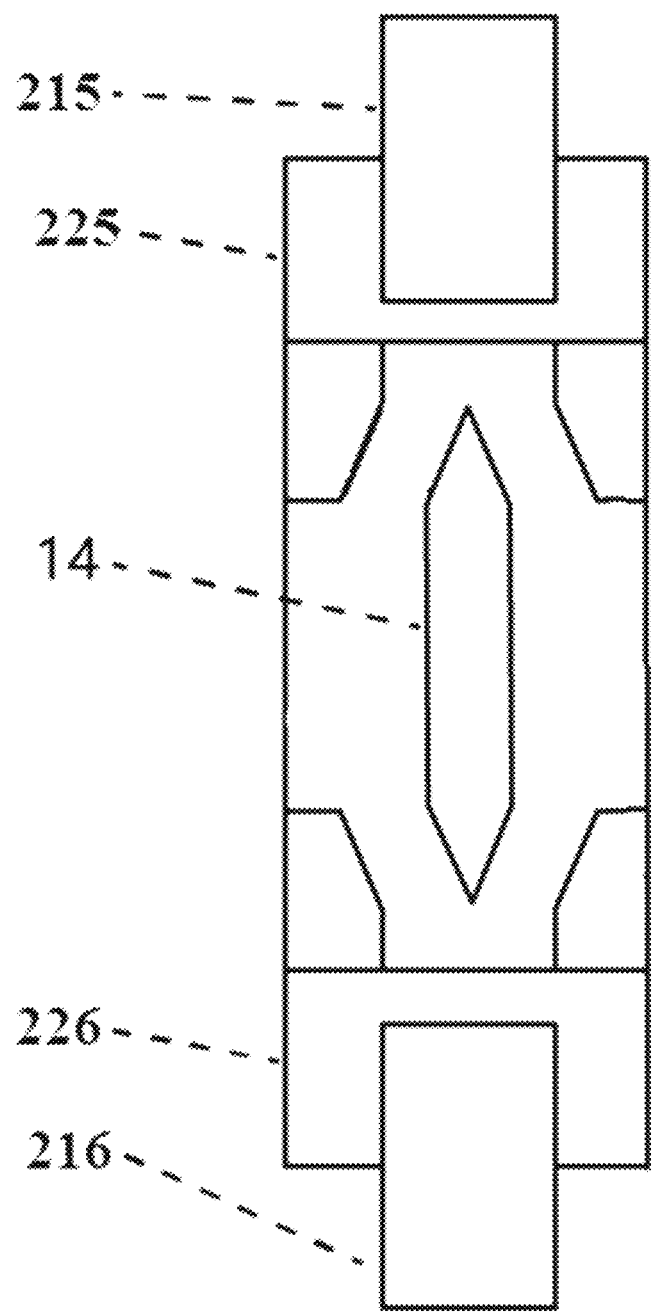
FIG. 11 is a third top view of an optical coupling system according to an embodiment of the present disclosure.
Figure 12:
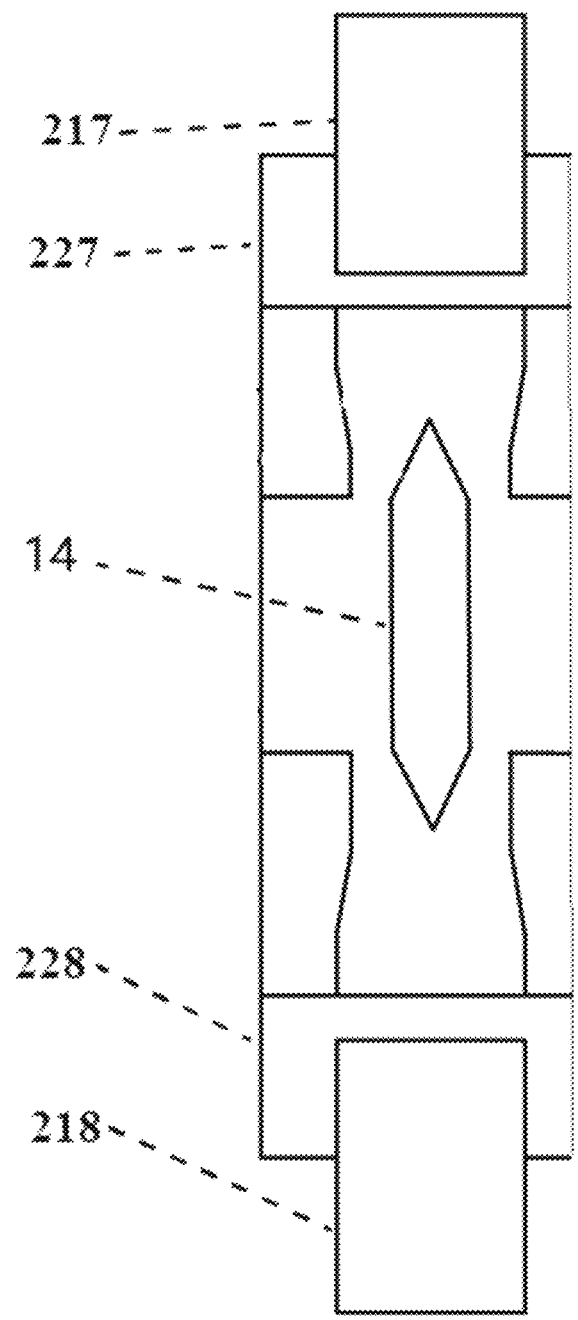
FIG. 12 is a fourth top view of an optical coupling system according to an embodiment of the present disclosure.

For example, FIG. 10, FIG. 11, and FIG. 12 schematically show optical coupling structures with different silicon dioxide waveguide end structures in a case that the silicon dioxide core layer completely encloses the lithium niobate optical waveguide. FIG. 10 is a schematic diagram of an optical coupling structure having an end structure with a constant width. FIG. 11 is a schematic diagram of an optical coupling structure having an end structure whose width gradually narrows in a direction away from the single-mode optical fiber to close to the single-mode optical fiber. FIG. 12 is a schematic diagram of an optical coupling structure having an end structure whose width gradually widens in a direction away from the single-mode optical fiber to close to the single-mode optical fiber. The optical coupling structure in actual application should include but not limited to these three situations.

Where, as shown in FIG. 10, an end face of the silicon dioxide core layer and an end face of the silicon dioxide cladding layer in the light transmission direction is connected to a single-mode optical fiber 213 by an adhesive 223, and another end face of the silicon dioxide core layer and another end face of the silicon dioxide cladding layer is connected to a single-mode optical fiber 214 by an adhesive 224. As shown in FIG. 11, an end face of the silicon dioxide core layer and an end face of the silicon dioxide cladding layer in the light transmission direction is connected to a single-mode optical fiber 215 by an adhesive 225, and another end face of the silicon dioxide core layer and another end face of the silicon dioxide cladding layer is connected to a single-mode optical fiber 216 by an adhesive 226. As shown in FIG. 12, an end face of the silicon dioxide core layer and an end face of the silicon dioxide cladding layer in the light transmission direction is connected to a single-mode optical fiber 217 by an adhesive 227, and another end face of the silicon dioxide core layer and another end face of the silicon dioxide cladding layer is connected to a single-mode optical fiber 218 by an adhesive 228.

This embodiment has following beneficial effects: since the optical coupling structure further includes an adhesive, the adhesive is provided on the end faces of the silicon dioxide core layer and the silicon dioxide cladding layer in the light transmission direction, and the difference value between the refractive index of the adhesive and the refractive index of the silicon dioxide core layer is less than 0.5, therefore a Fresnel reflection loss caused by a sudden change in refractive index is reduced during coupling of light from the optical coupling structure to the single-mode optical fiber. Furthermore, a technical problem of low coupling efficiency between the lithium niobate optical waveguide and the single-mode optical fiber existing in the related art may be alleviated, and it is beneficial to further improve the coupling efficiency between the lithium niobate optical waveguide and the single-mode optical fiber.

In another embodiment of the present disclosure, an optical coupling system in embodiments of the present disclosure is introduced in detail. The optical coupling system may include: a first single-mode optical fiber, a second single-mode optical fiber, and the optical coupling structure as described in the above embodiments.

A first end of the optical coupling structure is connected to the first single-mode optical fiber, a second end of the optical coupling structure is connected to the second single-mode optical fiber, and the first end of the optical coupling structure and the second end of the optical coupling structure are both located in the light transmission direction.

Figure 9:
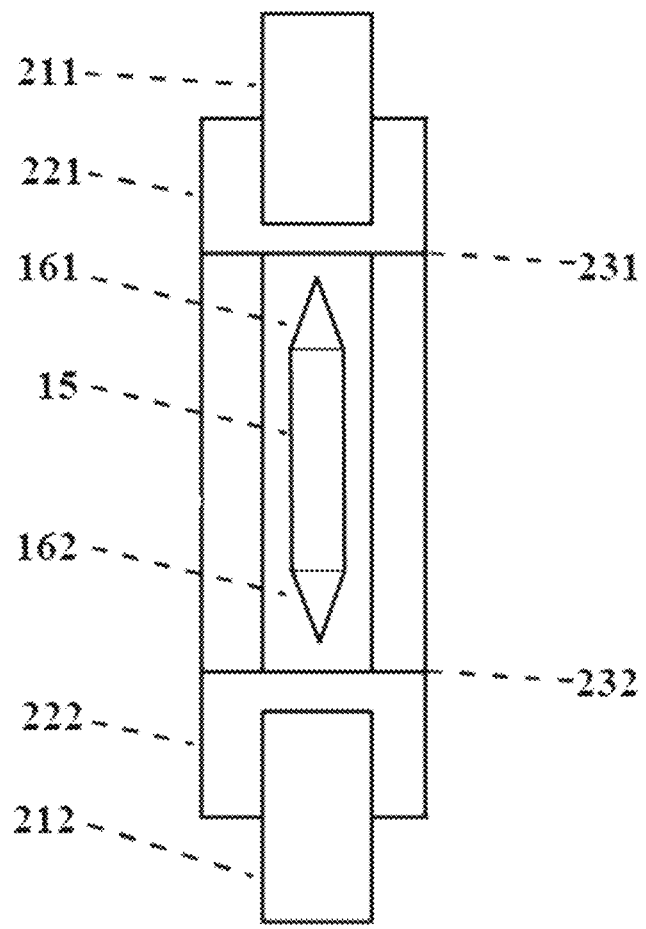
FIG. 9 is a first top view of an optical coupling system according to an embodiment of the present disclosure.

As shown in FIG. 9, a first end 231 of the optical coupling structure may be connected to a first single-mode optical fiber 211 by an adhesive 221, and a second end 232 of the optical coupling structure may be connected to a second single-mode optical fiber 212 by an adhesive 222.

Preferably, a difference value between the refractive index of the silicon dioxide core layer and the refractive index of the silicon dioxide cladding layer is $\Delta n$, and a difference value between a refractive index of a core region of the single-mode optical fiber and a refractive index of a cladding layer of the single-mode optical fiber is $\Delta n'$, and $n-\Delta n'<0.5$.

Where, as shown in FIG. 9, the lithium niobate optical waveguide may include a cuboid waveguide 15 in middle, and a first quadrangular prism waveguide 161 and a second quadrangular prism waveguide 162 located at both ends of the cuboid waveguide 15 respectively.

Preferably, the first quadrangular prism waveguide 161 is close to the first end 231, and an end face of the first quadrangular prism waveguide 161 away from the first single-mode optical fiber 211 is connected to an end face of the cuboid waveguide 15. A distance between the end face of the first quadrangular prism waveguide 161 that is close to the first single-mode optical fiber 211 and the first end 231 is greater than 0. A cross-sectional dimension of the first quadrangular prism waveguide 161 gradually decreases in a direction away from the first single-mode optical fiber 211 to close to the first single-mode optical fiber 211. The second quadrangular prism waveguide 162 is close to the second end 232, and an end face of the second quadrangular prism waveguide 162 away from the second single-mode optical fiber 212 is connected to an end face of the cuboid waveguide 15. A distance between the end face of the quadrangular prism waveguide 162 that is close to the second single-mode optical fiber 212 and the second end 232 is greater than 0. A cross-sectional dimension of the second quadrangular prism waveguide 162 gradually decreases in a direction away from the second single-mode optical fiber 212 to close to the second single-mode optical fiber 212.

A perpendicular distance between an end face of the first quadrangular prism waveguide 161 close to the first single-mode optical fiber 211 and an end face of the first quadrangular prism waveguide 161 away from the first single-mode optical fiber 211 is greater than 0.5 microns. A perpendicular distance between an end face of the second quadrangular prism waveguide 162 close to the second single-mode optical fiber 212 and an end face of the second quadrangular prism waveguide 162 away from the second single-mode optical fiber 212 is greater than 0.5 microns.

Preferably, to ensure a single-mode transmission, a preferred value range of a width and a height of the cuboid waveguide 15 may be 1 to 1.5 microns. The perpendicular distance between the end face of the first quadrangular prism waveguide 161 close to the first single-mode optical fiber 211 and the end face of the first quadrangular prism waveguide 161 away from the first single-mode optical fiber 211 may be 200 microns. The perpendicular distance between the end face of the second quadrangular prism waveguide 162 close to the second single-mode optical fiber 212 and the end face of the second quadrangular prism waveguide 162 away from the second single-mode optical fiber 212 may be 200 microns, so that an optical field may be slowly transited from the lithium niobate optical waveguide to a silicon dioxide waveguide to be formed later.

A shape of the end face of the silicon dioxide core layer is rectangular or trapezoidal. An area of the end face of the silicon dioxide core layer ranges from tens of square microns to hundreds of square microns. The difference value between the refractive index of the silicon dioxide core layer and the refractive index of the silicon dioxide cladding layer and the difference value between the refractive index of the core region the single-mode optical fiber and the cladding layer of the single-mode optical fiber is less than 0.5, so as to cause the optical coupling structure to match the mode field of the single-mode optical fiber, and reduce a mode mismatch loss caused by a mode mutation. Therefore, the technical problem of low coupling efficiency between the lithium niobate optical waveguide and the single-mode optical fiber existing in the related art may be alleviated, which is beneficial to further improve the coupling efficiency between the lithium niobate optical waveguide and the single-mode optical fiber.

The cross-sectional dimension of the first quadrangular prism waveguide gradually decreases in a direction away from the first single-mode optical fiber to close to the first single-mode optical fiber. The cross-sectional dimension of the second quadrangular prism waveguide gradually decreases in a direction away from the second single-mode optical fiber to close to the second single-mode optical fiber. It allows an optical field to be slowly transited from the lithium niobate optical waveguide to the silicon dioxide waveguide, and reduces an optical loss during the transition. Therefore, the technical problem of low coupling efficiency between the lithium niobate optical waveguide and the single-mode optical fiber existing in the related art may be alleviated, which is beneficial to further improve the coupling efficiency between the lithium niobate optical waveguide and the single-mode optical fiber.

The specific embodiments described above further describe the purpose, technical solutions and beneficial effects of the present disclosure in further detail. It should be understood that the above descriptions are only specific embodiments of the present disclosure and are not intended to limit the present disclosure. Any modification, equivalent replacement, improvement, etc. made within the spirit and principle of the present disclosure shall be included in the protection scope of the present disclosure.

So far, the embodiments of the present disclosure have been described in detail with reference to the drawings. Based on the above description, those skilled in the art should have a clear understanding of the present disclosure.

It should be noted that, in the drawings or the main body of the specification, the embodiments that are not shown or described are all forms known to those of ordinary skill in the art, and are not described in detail. In addition, the above definitions of various elements and methods are not limited to the various specific structures, shapes or methods mentioned in the embodiments, and those of ordinary skill in the art may simply modify or replace them.

Of course, according to actual needs, the method of the present disclosure also includes other steps, which are not described here because they have nothing to do with the innovations of the present disclosure.

In addition, the above definitions of various elements and methods are not limited to the various specific structures, shapes or methods mentioned in the embodiments, and those of ordinary skill in the art may simply modify or replace them.

It should be noted that the directional terms mentioned in the embodiments, such as "upper", "lower", "front", "rear", "left", "right", etc., only refer to the directions of the drawings, and are not used to limit the protection scope of this disclosure. Throughout the drawings, the same elements are represented by the same or similar reference numerals. When it may cause confusion in the understanding of the present disclosure, conventional structures or configurations will be omitted. The shape and size of each component in the figure do not reflect the actual size and proportion, but merely illustrate the content of the embodiment of the present disclosure. In addition, in the claims, any reference signs located between parentheses should not be constructed as limitations on the claims.

Unless clearly indicated, the numerical parameters in this specification and the appended claims are approximate values and may be changed according to the required characteristics obtained through the content of the present disclosure. Specifically, all numbers used in the specification and claims to indicate the content of the composition, reaction conditions, etc., should be understood as being modified by the term "approximate" in all cases. In general, the meaning of its expression refers to a change of ±10% in some embodiments, a change of ±5% in some embodiments, a change of ±1% in some embodiments, and a change of ±0.5% in some embodiments.

The word "comprising" or "including" does not exclude the presence of elements or steps not listed in the claims. The word "a" or "an" preceding an element does not exclude the presence of multiple such elements.

The ordinal numbers used in the specification and claims, such as terms such as "first", "second", and "third", are used to modify the corresponding element. It does not mean that the element has any ordinal number, nor does it represent an order of a certain element and another element, or the order of the manufacturing method. The use of these ordinal numbers is only used to clearly distinguish an element with a certain name from another element with the same name.

Similarly, it should be understood that in order to simplify the present disclosure and help understand one or more of the various disclosed aspects, in the above description of the exemplary embodiments of the present disclosure, the various features of the present disclosure are sometimes grouped together into a single embodiment, figure, or its description.

However, the disclosed method should not be interpreted as reflecting the intention that the claimed disclosure requires more features than those explicitly recorded in each claim. More precisely, as reflected in the following claims, the disclosure aspect lies in less than all the features of a single embodiment previously disclosed. Therefore, the claims following the specific embodiment are thus explicitly incorporated into the specific embodiment, where each claim itself serves as a separate embodiment of the present disclosure.

The specific embodiments described above further describe the purpose, technical solutions, and beneficial effects of the present disclosure in further detail. It should be understood that the above descriptions are only specific embodiments of the present disclosure and are not intended to limit the present disclosure. Any modification, equivalent replacement, improvement, etc., made within the spirit and principle of the present disclosure shall be included in the protection scope of the present disclosure.

What is claimed is:

1. An optical coupling structure, comprising:
    a base substrate, wherein the base substrate comprises a quartz substrate layer, a silicon dioxide buried layer, and a lithium niobate thin film layer in order from bottom to top, and a refractive index of the silicon dioxide buried layer is higher than a refractive index of the quartz substrate layer;
    a lithium niobate optical waveguide formed on the base substrate;
    a silicon dioxide core layer formed on peripheral walls of the lithium niobate optical waveguide and enclosing the lithium niobate optical waveguide; and
    a silicon dioxide cladding layer formed on peripheral walls of the silicon dioxide core layer and enclosing the silicon dioxide core layer.

2. The optical coupling structure according to claim 1, wherein an end face of the silicon dioxide core layer is rectangular or trapezoidal, and an area of the end face of the silicon dioxide core layer ranges from tens of square microns to hundreds of square microns.

3. The optical coupling structure according to claim 2, further comprises an adhesive,
    wherein the adhesive is provided on end faces of the silicon dioxide core layer and the silicon dioxide cladding layer in a light transmission direction, and a difference value between a refractive index of the adhesive and a refractive index of the silicon dioxide core layer is less than 0.5.

4. An optical coupling system comprising: a first single-mode optical fiber, a second single-mode optical fiber, and the optical coupling structure according to claim 1;
    wherein a first end of the optical coupling structure is connected to the first single-mode optical fiber, a second end of the optical coupling structure is connected to the second single-mode optical fiber, and the first end and the second end are both located in the light transmission direction.

5. The optical coupling system according to claim 4, wherein a difference value between a refractive index of the silicon dioxide core layer and a refractive index of the silicon dioxide cladding layer is $\Delta n$, and a difference value between a refractive index of a core region of the single-mode optical fiber and a cladding layer of the single-mode optical fiber is $\Delta n'$, and $\Delta n - \Delta n' < 0.5$.

6. The optical coupling system according to claim 5, wherein the lithium niobate optical waveguide comprises a cuboid waveguide in middle, and a first quadrangular prism waveguide and a second quadrangular prism waveguide located at both ends of the cuboid waveguide respectively;
    wherein the first quadrangular prism waveguide is close to the first end, an end face of the first quadrangular prism waveguide away from the first single-mode optical fiber is connected to an end face of the cuboid waveguide, a distance between an end face of the first quadrangular prism waveguide close to the first single-mode optical fiber and the first end is greater than 0, and a cross-sectional dimension of the first quadrangular prism waveguide gradually decreases in a direction away from the first single-mode optical fiber to close to the first single-mode optical fiber; and
    wherein the second quadrangular prism waveguide is close to the second end, an end face of the second quadrangular prism waveguide away from the second single-mode optical fiber is connected to an end face of the cuboid waveguide, a distance between the end face of the second quadrangular prism waveguide close to the second single-mode optical fiber and the second end is greater than 0, and a cross-sectional dimension of the second quadrangular prism waveguide gradually decreases in a direction away from the second single-mode optical fiber to close to the second single-mode optical fiber.

7. A method for preparing an optical coupling structure, comprising:
    step S101: preparing a base substrate, wherein the base substrate comprises a quartz substrate layer, a silicon dioxide buried layer, and a lithium niobate thin film layer in order from bottom to top, and a refractive index of the silicon dioxide buried layer is higher than a refractive index of the quartz substrate layer;
    step S102: forming a lithium niobate optical waveguide on the base substrate;
    step S103: forming a silicon dioxide core layer enclosing the lithium niobate optical waveguide on peripheral walls of the lithium niobate optical waveguide;
    step S104: forming a silicon dioxide cladding layer enclosing the silicon dioxide core layer on peripheral walls of the silicon dioxide core layer.

8. The method for preparing an optical coupling structure according to claim 7,
    wherein the forming a lithium niobate optical waveguide on the base substrate comprises:
        etching the lithium niobate thin film layer by photo-etching to form the lithium niobate optical waveguide.

9. The method for preparing an optical coupling structure according to claim 8, wherein the forming a silicon dioxide core layer enclosing the lithium niobate optical waveguide on peripheral walls of the lithium niobate optical waveguide comprises:
    forming a silicon dioxide capping layer on a structure formed in step S102;
    planarizing the silicon dioxide capping layer;
    removing a part of the silicon dioxide capping layer and a part of the silicon dioxide buried layer by photoetching, and etching is performed to the top of the quartz substrate layer; wherein an etched silicon dioxide capping layer and an etched silicon dioxide buried layer form the silicon dioxide core layer; and a length of the silicon dioxide core layer in a light transmission direction is greater than a length of the lithium niobate optical waveguide in the light transmission direction.

10. The method for preparing an optical coupling structure according to claim 9, wherein the forming a silicon dioxide cladding layer enclosing the silicon dioxide core layer on peripheral walls of the silicon dioxide core layer comprises:

forming a silicon dioxide top layer on a structure formed in step S103, wherein the silicon dioxide top layer and the quartz substrate layer form the silicon dioxide cladding layer; and the length of the silicon dioxide core layer in the light transmission direction is equal to a length of the silicon dioxide cladding layer in the light transmission direction.

* * * * *